May 8, 1962 R. R. BELL ET AL 3,033,941

MEANS FOR ALTERING TELEPHONE OPERATION

Filed July 14, 1958 2 Sheets-Sheet 1

INVENTORS.
ROBERT R. BELL
CARL O. FRIEND
BY
Parker and Carter
ATTORNEYS.

May 8, 1962 R. R. BELL ET AL 3,033,941

MEANS FOR ALTERING TELEPHONE OPERATION

Filed July 14, 1958 2 Sheets-Sheet 2

INVENTORS.
ROBERT R. BELL
CARL O. FRIEND
BY Parker and Carter
ATTORNEYS.

United States Patent Office 3,033,941

Patented May 8, 1962

3,033,941

MEANS FOR ALTERING TELEPHONE OPERATION

Robert R. Bell, 606 W. Wisconsin Ave., and Carl O. Friend, 3073 S. Chase Ave., both of Milwaukee, Wis.

Filed July 14, 1958, Ser. No. 748,259
9 Claims. (Cl. 179—89)

Our invention relates to a new and novel means for altering the operation of telephones to thereby increase their effectiveness.

The telephone today has become virtually a necessity as a means of communication, particularly in business and industry. The usual manner of signaling the person called or call-receiver frequently becomes an intrusion of privacy and busy people such as business executives may wish that they could eliminate all but truly essential telephone calls. To entrust this matter to the discretion of another person such as a secretary is not always satisfactory however. Frequently, the person initiating the telephone call or call-initiator is capable of deciding whether answering the call would be regarded as essential.

Our system permits a call-receiver to alter at will the normal signaling of his telephone so that, while so altered, he will receive no calling signals such as the conventional ringing bell, but instead will receive a signal only if the call-initiator decides that his message is truly important enough to warrant an interruption. While the call-receiver's telephone is so altered, the call-initiator will hear a special and distinctive signal indicating that the call-receiver does not wish to be intruded upon unless it is absolutely essential. If the telephone of the call-initiator is equipped with a suitable complementary device, the call-initiator can then decide whether to transmit the special signal which will cause the call-receiver to be signaled. Call-initiators having telephones not so equipped would be unable to intrude until the call-receiver restores normal telephone operation.

With our device, telephones may be altered in such a manner that busy people are permitted to work without undesired interruptions, but at the same time, are able to receive essential incoming calls. Our device eliminates the discretion of a third party, such as a secretary, in putting through essential telephone calls and substitutes the discretion of the caller who may often be in the position to know whether or not his call is essential. Our device also eliminates the inconvenience to others, as well as the call-initiator, caused by the absence of a secretary who may be away from her desk for a variety of reasons by informing the call-initiator of his inability to put his call through. In other words, the call-initiator need not keep trying the call with consequent demands on the time of other persons because he is informed that the call-receiver does not wish to be disturbed at that particular time and the reason is immaterial.

Some of the above mentioned advantages would be of immediate benefit upon installation of the system in existing circuits. With the passing of time and the familiarity acquired through use of the system, even greater advantages would accrue. For example, repeated use of circuits embodying our device which would induce brevity of conversations because repeated calls by a call-initiator to a call-receiver having a telephone equipped with our system would tend to indicate the relative activity at the call-receiving end of the line. Further, unessential calls would be actually deferred because if the call-initiator is aware of the fact that the call receiver is extremely busy at the moment, he will drop calls that actually need not be made or could be easily made at a later time. In addition, there will be less telephone tie-up from busy lines with a corresponding increase in telephone availability.

Another very practical advantage which would become apparent as soon as the call receiver acquired the habit of disconnecting his bell circuit would be the avoidance of the all too frequent embarrassing telephone question situation. Frequently, a call-receiver is not at liberty to speak openly in the presence of others. With the bell ringing circuit disconnected, the chance of a call from a call-initiator having questions best answered at a time when the call receiver is alone is decreased, because the call-initiator could force himself on the call-receiver only if his telephone was equipped with a circuit restoring device, and then only with the full knowledge that the call-restorer has someone with him or is otherwise preoccupied.

Perhaps the greatest advantage resulting from use of our system is one which is manifested less openly but which actually results in a greater benefit to telephone users. This benefit is the indirect creation of greater overall business efficiency due to improved useage of the telephone. The telephone is a very efficient and money-saving business device when used intelligently but it can be a nuisance and crutch if used indiscriminately. Since our system indicates to the call-initiator the relative availability of the call receiver, the call-initiator is guided in his demands upon the call-receiver. With a decreased demand on the call-receiver's time, he is able to devote more of his time to productive activity.

Accordingly, a primary obect of our invention is the provision of an apparatus for altering the operation of telephones that when desired, can eliminate all but absolutely essential calls.

Another object is the provision of an altered telephone system which permits a call-initiator to be apprised of the fact that the person called does not wish to be interrupted except for absolutely essential calls.

Another object is the provision of an altered telephone system whereby a call-initiator who receives an indication that the call-receiver does not wish to be disturbed at this time except for essential calls may nonetheless break through the call shutout if his instrument is equipped with a suitable complementary device for interrupting the shutout imposed by the call-receiver.

Another object is the provision of a telephone system in which a call-receiver's signaling device may be disconnected at will by the call-receiver for periods up to and beyond one hour.

Another object is the provision of a novel telephone system in which a circuit, such as a bell ringing circuit, may be disconnected for periods of time up to one hour or more by means of a timing device.

Another object is the provision of a novel timer for maintaining a circuit, such as a bell ringing circuit, disconnected based upon a capacitor discharge principle whereby disconnections for periods of time up to one hour or more may be maintained.

Yet another object of our invention is the provision of a restoring circuit which will permit a call-initiator having a suitably equipped telephone to break through the call shutout set up by the call-receiver, and will automatically restore the shutout at the end of the call.

Our invention is illustrated more or less diagrammatically in the accompanying drawings, wherein.

Figure 1:
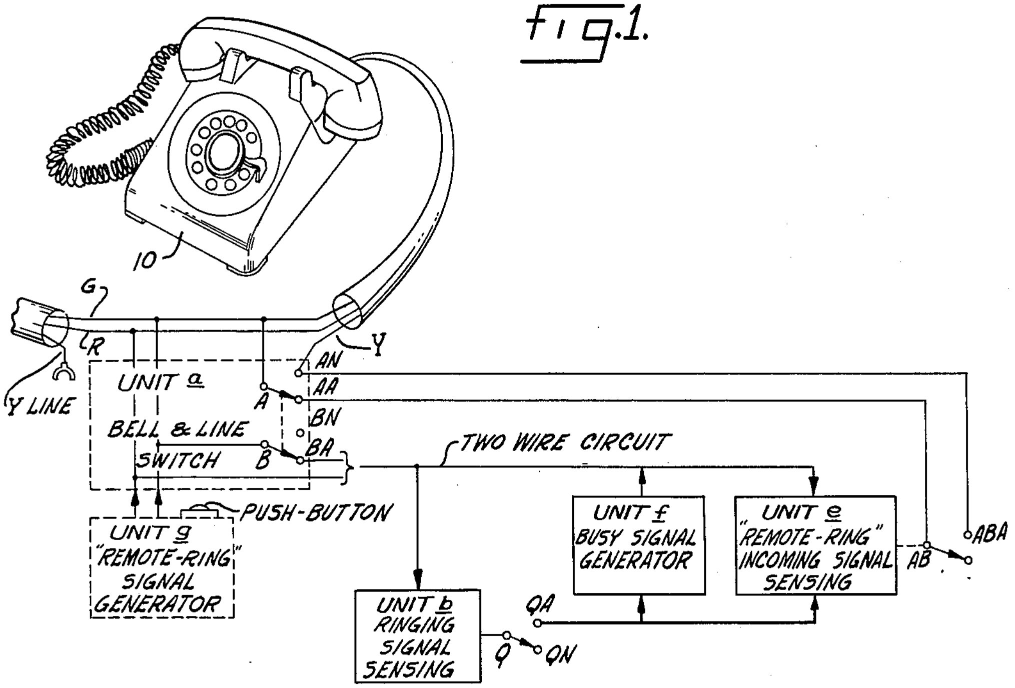
FIGURE 1 is a block schematic diagram of a system for altering a call-receiver telephone circuit to preclude reception of all calls except those emanating from a telephone equipped with a circuit interrupter.

Referring now to FIGURE 1, one method of implementing our invention is shown in block form. A standard telephone instrument having a conventional bell signaling circuit has been modified so as to bring one of the bell wires Y out through the connecting cord, the other bell wire being connected within the instrument to a line wire, R. For purposes of clarity and description, we have indicated some lines with letters which may correspond to colors. For example, Y would be yellow, G green, R red and O orange. The incoming telephone line G is connected to a switch A which may break the telephone bell circuit at AN, leaving the telephone line wires G, R, connected to the instrument, and simultaneously connect the bell circuit to contact AA, and the telephone line wire G to the contact designated BA.

For example, switch A—B could be a toggle switch, a lever switch, or a remotely controlled relay which could be controlled by a timer controlled switching device, contained in a box and indicated in the drawings diagrammatically as unit *a*.

When switch A—B is in the position shown and a ringing signal is received over the incoming line, the instrument bell does not ring, but instead a ringing signal sensing unit *b*, actuates a ring relay switch Q making contact at QA which turns on a distinctive busy-signal generator unit *f*. This distinctive signal is fed back into the line through contact BA to indicate that the receiving party's telephone bell or signaling device has been disconnected because he does not wish to be disturbed unless it is absolutely essential. In this case, the calling party must have an instrument equipped with a remote ring signal generator unit *g* with which he can generate and send a signal which will be received by unit *e* to thereby close contacts AB and ABA to restore the bell circuit. Unit *e* is a remote-ring-incoming-signal sensing circuit.

During the time that the bell in the base of the telephone instrument 10 has been disconnected, the ringing signal has continued to be received because the line has not been effectively bridged in a manner equivalent to "answering" the telephone, and, therefore, the ring-cut-off relay at the central office has not been actuated. Consequently, if the call-initiator's telephone is equipped with a remote ring signal generator unit *g*, which has been actuated, the conventional ringing signal now operates the bell in the telephone 10, and if the receiving party is present he can answer the telephone in the normal manner. Answering the telephone bridges the line with a low impedance which actuates the ring-cut-off relay in the central office and the bell thereupon stops ringing. This is sensed by unit *b* which disconnects the remainder of the apparatus to await the next call.

Our system will function on the succeeding call in exactly the same manner provided switch A remains thrown to contact AA.

During this time, the receiving party can also make outgoing calls in the normal manner without altering the functions of the telephone.

Diagrammatically represented at *g* is a remote-ring-signal generator unit. This generator is actuated by push button PB which reactivates the signaling circuit of the call-receiver. Thus, when a call-initiator hears the distinctive busy-signal of the call-receiver, the initiator may, at his discretion, still break through the call shutout by pushing his own button PB to thereby enable his call to operate the bell signaling circuit in the call-receiver's telephone.

From a functional standpoint, the operations outlined in FIGURE 1 may be implemented as follows: Switch A—B could be a relay having several contacts which is controlled by an electronic timing circuit. The user could thereby set the device in advance for a predetermined period of time in which minimum interruption was desired. At the end of that predetermined time, the telephone signaling circuit would return to normal operation even if the user forgot to restore the switching device *a* to normal operation.

Unit *b* might be a suitable relay circuit actuated by the incoming ringing signal and could include provisions for holding the relay during standard intervals between ringing pulses. A five second delay should be adequate for example.

The distinctive busy-signal generator unit *f* could consist of any apparatus capable of transmitting a distinctive tone or signal over the line. For example, we might employ an electronic oscillator capable of generating a tone of sufficient strength to be readily heard by the calling party, and this tone might even be interrupted at a rate of two or three times per second in order to give the effect of the well known busy-signal. The pitch of the tone should differ from the standard busy-signal so that it is readily distinguishable. This signal is coupled to the line in a manner which does not draw D.C. from the line or otherwise act to bridge the line in such a way to actuate the "ring-cut-off" relay at the telephone central office. This assures that the ringing signal will continue to be received and can be used to actuate the local telephone bell or other signaling device if the special "remote-ring" signal is received by unit *e*. The entire apparatus could be made to function equally well if the ring-cut-off relay had been actuated, but this would then require an additional suitable power circuit with which to actuate the local telephone bell when reconnected by unit *e*, and a revision of the relay holding circuit in unit *b*.

The remote-ring incoming-signal sensing-unit *e* senses the signaling circuit restoring signal generated by the caller's unit *g* when the call-initiator wishes to interrupt the call-receiver. The nature of this signal is circumscribed and determined by the parameters and characteristics of the telephone line and the related equipment. A major requirement is that unit *e* must not be actuated by the effects of the standard ringing signal or by speaking, shouting, whistling, etc., into the telephone of the call-initiator, or by random line noise or switching transients. Conversely, unit *e* must be actuated only by a special signal generated by the remote-ring signal generator unit *g*. Consequently, the special signal should not resemble the regular ringing signal or normal voice frequencies or sounds which could be emitted by the call-initiator. For this reason, we have used frequencies near the upper-most limits of the range of frequencies transmitted by the usual telephone circuits without undue attention. Frequencies on the order of 2500 to 2800 cycles are satisfactory though they need not be restricted to such a range.

To minimize the effects of random line noise and switching transients upon unit *e*, as well as to minimize the effects of sounds transmitted by the mouthpiece of the call-initiator, we have found it desirable to restrict the band of frequencies introduced into unit *e* by means of a band-pass filter, or peaking coil or resonant circuit. Since even the random line noise in this limited range of frequencies in the "pass-band" can have an equivalent effective value of .1 volt R.M.S. or more, we have found it desirable to limit the sensitivity of unit *e* to require at least .15 R.M.S. equivalent of special signal to be received before contacts AB and ABA will close.

Similarly, because of normal line and circuit attentuation, we have found it desirable to introduce into the line at the sending end, by the special signal generator unit *b*, approximately 2 v. R.M.S. equivalent value, although lesser values will work satisfactorily if distances are not as great. "Cross-talk" effect of this signal level is not objectionable because of the frequency employed and lesser levels virtually eliminate any such effect.

Unit *e*, therefore, may consist of a resonant filter circuit tuned, for example, to 2.8 kc., followed by amplifier and relay operating circuits for closing contacts AB and ABA to re-establish the local bell circuit.

Unit *g* may consist of an electronic generator circuit, and amplifiers if required, for introducing an alternating current of the same frequency, 2.8 kc., to the telephone line at an impedance of approximately 150 ohms, employing capacitative coupling.

Figure 2:
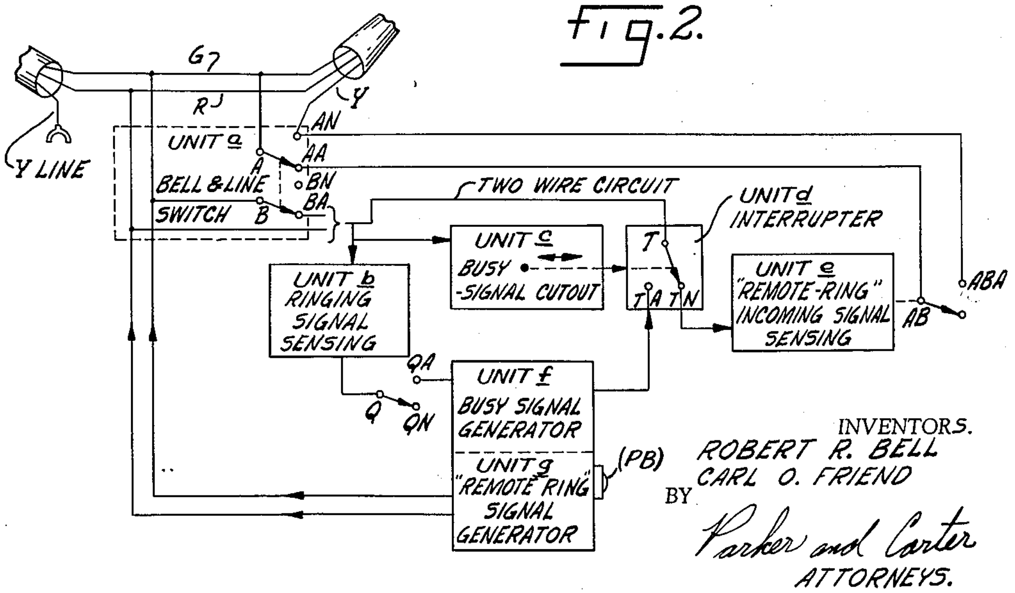
FIGURE 2 is a modification of the system shown in FIGURE 1 wherein certain functions have been combined in order to simplify the circuitry and take advantage of component parts.

Referring now to FIGURE 2, we have shown a modification of my invention in which units *f* and *g* have been combined, and unit *f* performs a double function. That is, it generates the above described busy-signal and also when button PB is depressed, generates the special "remote-ring" actuating signal.

As an additional feature, we have found it practical to transmit the distinctive busy-signal frequency of unit *f* intermittently by switching it on and off by a relay circuit *d* operating at, say two or three times a second. This distinctive interrupted tone helps to identify it as a busy signal since similar interrupting technique is standard practice in most telephone installations for signifying a line in use. Of course, in this instance, the frequency of the tone is markedly different from the conventional busy-signal and indicates to those familiar with the system that the called party does not wish to be intruded upon unless essential. The use of interrupter relay *d* permits unit *e* to be connected to the line only during those intervals when unit *f* is disconnected thereby removing any effect unit *f* might have on the performance of unit *e*, with a consequent improvement in the reliability of operation.

A further feature illustrated in FIGURE 2 is the provision of a relay unit *c* which discontinues the busy-signal from unit *f* during the time in which each regular ringing pulse is received, the busy signal being sent out only between the regular ringing pulses thereby emphasizing to the call-initiator that the phone of the party called can still be signaled by the continuing ringing pulses if the calling party sends the necessary additional signal.

Figure 3:
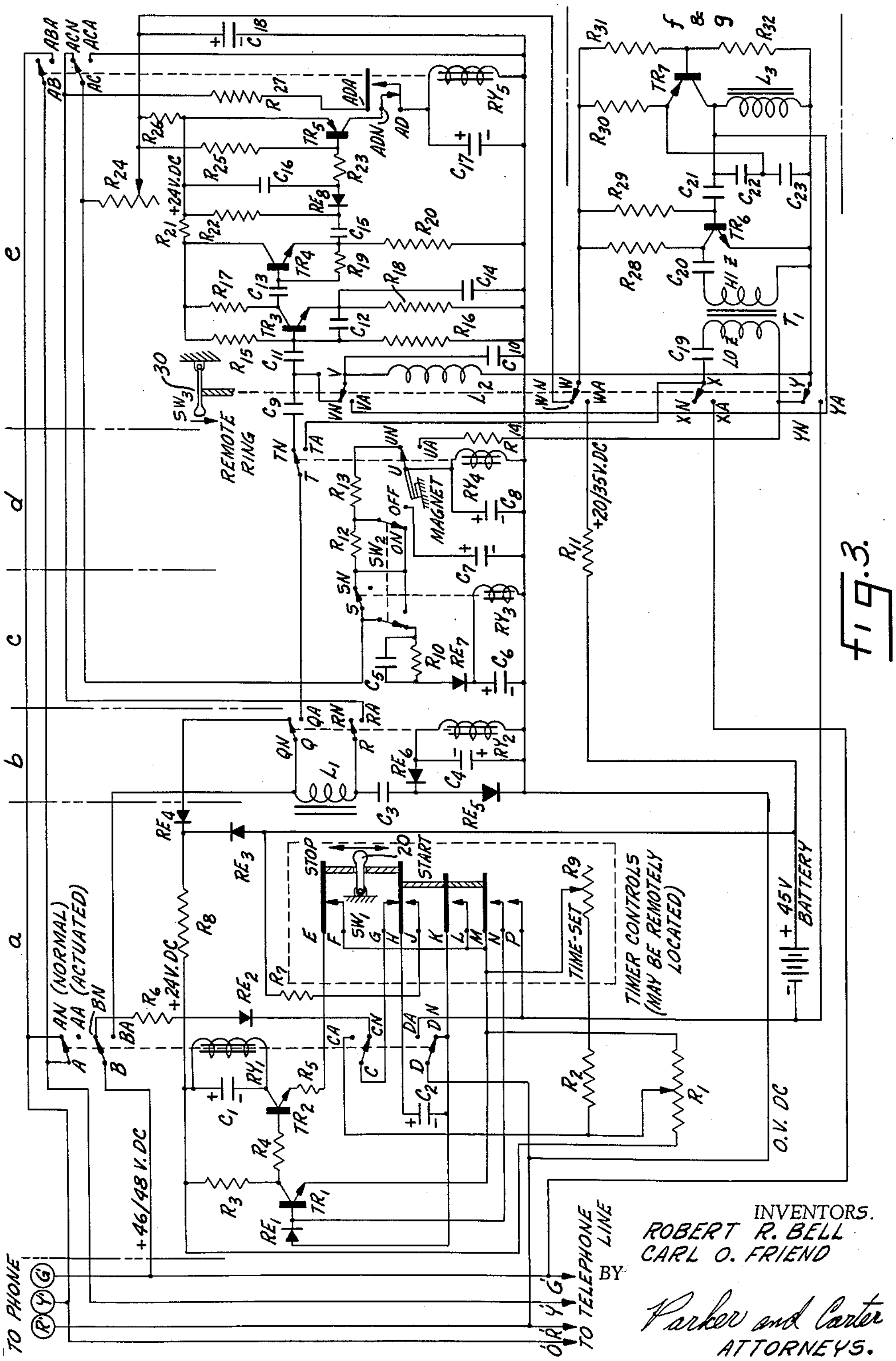
FIGURE 3 is a detailed schematic diagram of the circuits used in the system illustrated in FIGURES 1 and 2.

A circuit for the diagrammatic illustration of FIGURES 1 and 2 including an electronic circuit for controlling switch A is shown in FIGURE 3. In this figure, the units of FIGURES 1 and 2 are designated across the top and along the lower right hand side.

*Unit a. Timer Controlled Switching Device*

This circuit is entirely electronic, consisting of an electric relay which performs the switching function. This relay is "closed" (actuated) at the start of the timed period, and "opened" at the end of the timed period, and the timing is reliably performed, for intervals up to one hour and longer, by a unique transistorized "capacitor discharge" circuit which makes use of several unrelated characteristics of standard manufactured components, in proper combination, to provide unusually accurate time intervals and, at the end of the timed interval, relatively sudden collapse of the otherwise constant relay holding current. In essence, the major purpose of the relay is to disconnect the normal signaling bell circuit, contacts A, AN, for the duration of the timed interval, and simultaneously to connect the line voltage, "green" +48 v. D.C. wire, to the remainder of the device through contacts B, BA, for use in units *a* through *g* as a power source and to provide the necessary path for the signaling functions.

Capacitor $C_2$ is normally connected continuously across the 48 v. D.C. telephone line through resistor $R_6$ and crystal-diode rectifier $RE_2$ through contacts H, G; C, CN; BN, B; and DN, D. This keeps the capacitor fully charged and ready for use in the capacitor-discharge timing circuit, but more important, keeps the capacitor fully "formed" so that its internal resistance is extremely high. For example, it may exceed 50 megohms when voltage has dropped from 48 to 40 volts, and is still higher at lower voltages. $R_6$ prevents capacitor $C_2$ from effectively bridging the line to A.C. ringing currents, and $RE_2$ effectively disconnects the charged capacitor from the line when the telephone is in use and line voltage drops to relatively low values, such as 5–10 volts.

When the timer starting lever 20 is depressed, capacitor $C_2$ is instead temporarily connected across the 45 volt battery through $R_7$ and contacts HJ, KL, MP, which thereby assures a uniform capacitor voltage at the start of each timing interval. If the capacitor has not previously been fully charged by the telephone line, as might occur if the capacitor has very recently been discharged, the battery quickly charges it through relatively low resistance $R_7$. The battery is also connected across the collector and emitter of $TR_1$ by a path through $RE_3$, $R_8$, $R_3$, and contacts MP, but no significant current flows through $TR_1$ because contacts MN connect its base to its emitter, making $TR_1$ non-conducting. Therefore, there is no voltage drop through $R_3$, and so the base of $TR_2$ remains biased positive with respect to its emitter (the base current being limited by its internal resistance and that of $R_4$ plus $R_3$), thereby making $TR_2$ conducting. Relay $RY_1$ is therefore also actuated by the battery at the same time, through $RE_3$, $R_8$, coil $RY_1$, $TR_2$, $R_5$ and contacts EF, MP. Thereby, the relay

*a.* Disconnects the telephone bell circuit, contacts A, AN;
*b.* Connects the "green" (48 v. D.C.) line-wire to the remainder of the apparatus, contacts B, BA;
*c.* Establishes a circuit to connect (when the starting lever is released) the positive capacitor terminal of $C_2$ to the moving arm of $R_1$—contacts H, G; C; CA; the negative capacitor terminal being permanently connected to the base of $TR_1$ through $RE_1$; and
*d.* Holds the negative battery terminal connected to the "O.V. D.C." line as long as the relay is closed (contacts DA, D; which parallel contacts MP).

When the starting lever 20 is released, contacts NM open, removing the "short-circuit" between the base and emitter of $TR_1$, and contacts HG close, thereby placing the anode of $RE_1$ at 45 v. negative potential with respect to the moving arm of $R_1$ by means of a path through contacts C, CA. The resulting voltage drop across the high back-resistance of non-conducting $RE_1$ and the high base-emitter resistance of non-conducting $TR_1$ holds the base negative with respect to the emitter, and therefore $TR_1$ remains non-conducting and $RY_1$ remains closed.

$C_2$ is now shunted by $R_2$ and $R_9$ in series, but effectively isolated from the remainder of the circuit by the very high back-resistance of silicon diode $RE_1$ plus the relatively high base-emitter "back-resistance" of reverse-biased non-conducting $TR_1$ transistor. Thus, effectively, $C_2$ discharges through timer resistances $R_2$ plus $R_9$, and the latter can be calibrated almost linearly in intervals of time. If the arm of $R_1$ were set at $TR_1$ emitter potential, $TR_1$ would never become sufficiently conducting to develop a voltage drop through $R_3$ which would shut off $TR_2$ and open relay $RY_1$, since the base of $TR_1$ must be made positive with respect to its emitter potential to cause $TR_1$ conduction. Even then, because the flow of a minute base current through $RE_1$ results in a voltage drop which tends to bias the base negatively, the arm of $R_1$ must be anywhere from 3 to 4 volts positive, or more, with respect to $TR_1$ emitter potential, to assure relay drop-out when the capacitor $C_2$ is virtually discharged.

As capacitor $C_2$ becomes nearly discharged and $TR_1$ base potential rises toward and above emitter potential, and also as a result of the current amplification of $TR_1$, the last several seconds of capacitor $C_2$ discharge result in fairly rapid increasing voltage drop through $R_3$. Because of the amplification of $TR_2$, and as its base potential drops to its emitter potential, the relay holding current is even more suddenly cut-off to end the timing cycle. Thus, even after intervals of one hour, the time required for decay of relay holding current may be measured in seconds. Therefore, there is no danger of jarring the timing relay open near the end of the time period, since the holding current does not decrease as the capacitor voltage decreases, and the timer circuit is substantially immune to electrical and mechanical disturbances. It is virtually free from wear since the only moving parts are the start-stop lever switch, the relay contacts and armature which act only at the start and the end of the timed interval, and the time-set potentiometer which need not be moved at all, until a different time interval is desired.

As a further refinement, in step "*b*" referred to above, the 48 v. D.C. line potential is connected through B, BA to Q, QN to $RE_4$, and since $RE_4$ is therefore slightly positive with respect to $RE_3$, the latter becomes nonconducting, and the telephone line supplies the approximately 2 milliampere relay holding current through $RE_4$. This small current drain causes line voltage to drop to about 45½–46 volts. $RE_3$ protects the battery from small reverse currents which would quickly ruin it, and also assures that even if the line voltage drops further, through use of the telephone or otherwise, the timer will continue to function and the voltage variations across $R_1$ will be negligible. Battery drain in normal operation over any considerable period of time is therefore exceedingly small and battery life correspondingly greatly extended.

Should it be desired to inactivate the timer before the preset time has elapsed, thereby re-establishing the normal telephone signaling function, it is only necessary to move the lever switch 20 to the "stop" position momentarily, for this opens contacts EF breaking the relay coil circuit, and the relay drops out thus opening contacts B, BA which had supplied relay holding current from the line through contacts Q, QN. Contacts DA, D are also opened and this disconnects the battery so it will not continue to supply current to any of the associated circuitry, for this would also shorten its life.

Alternately, unit *a* could consist of a conventional electric clock motor. Since such devices are well known in the art and their function well understood, further explanation or illustration is not thought necessary.

*Unit b. Ringing Signal Sensing*

Capacitor $C_3$ is intended to couple A.C. ringing signals to a relay circuit which includes $RY_2$, and to isolate this relay circuit from D.C. line potential so no D.C. load will be placed on the line. When the timer relay $RY_1$ is closed, capacitor $C_3$ is charged to line voltage (now about 46 v. D.C.) through contacts BA and $L_1$ and $RE_5$. When an incoming ringing pulse is received (generally about 32 v. A.C. superimposed upon about 46 v. D.C. for a duration of about 2 seconds) the line voltage varies from about O.V. instantaneous potential to about 90 v., instantaneous (and vice versa) at ringing signal frequency.

Assuming, at any given instant, that the line voltage is increasing to 90 v., capacitor $C_3$ is being charged to nearly this potential, since $RE_5$ is conducting, and the resistance drop through $L_1$ is small and its reactance nearly as low at ringing frequency. As line voltage decreases from 90 v., the nominal 90 v. charge on $C_3$ places its negative terminal at a potential negative to the "O.V. D.C." line wire, and $RE_5$ ceases to conduct. Since the cathode of $RE_6$ is thereby being made negative with respect to the O.V. D.C. line, to which its anode is connected by the low impedance of $C_4$, RE begins to conduct and to charge $C_4$ from the charge contained in $C_3$. This $C_4$ charge accumulates to about 50 volts in 2 seconds. Relay $RY_2$ closes at 12 volts, or about ½ second after the first ringing pulse begins, and the large capacity of $C_4$ holds this relay closed for about 5 seconds until the next pulse is received. Thus, relay $RY_2$ closes virtually at the start of the first pulse of the ringing signal and stays closed until the ringing signal has ceased (the latter being caused by either the call-initiator "hanging-up" to discontinue his call, or by the call-receiver lifting his handset from the cradle which bridges the line and actuates the ring-cut out relay at the central office), thereby assuring for the identical duration of time that contacts Q, QA and R, RA remain closed to carry out the other functions of the device. Contacts Q, QA feed all line voltages and any desired incoming special "remote-ring" signal to unit *e*, and feed any outgoing busy-signal to the telephone line; inductance $L_1$ prevents capacitance $C_3$ from short-circuiting these two signals, since its inductive reactance to their frequencies is several thousand ohms. $L_1$ also serves this function for the other components in units *c, d e, f* and *g* which are connected to terminal RA.

*Unit c. Busy-Signal Cutout during Ringing Pulse*

The previously mentioned function of this optional unit is to discontinue the special busy-signal during the interval in which the incoming ringing pulse is being received, on the assumption that this may be of additional value in emphasizing to the call-initiator that the ringing signal has not been discontinued and, therefore, notwithstanding the special busy-signal, the called party could still answer the call if his bell were made to ring.

FIGURE 3 shows switch $SW_2$ which may be used to remove unit *c* from the circuit, should this be considered desirable; with $SW_2$ in the "on" position, unit *c* is fed line voltage and incoming ringing signal by a path through contacts B, BA; R, RA; and ACN, AC. Resistance $R_{10}$ is of very high value, so it places negligible D.C. load on the line, but it forms a voltage divider with the coil of the D.C. relay $RY_3$ which thereby prevents $C_5$ from charging to full line voltage. $C_5$ is of relatively large capacity and presents a relatively low impedance to ringing signal voltages. Thus, when a ringing pulse is received, the anode of $RE_7$ spends most of each cycle at a potential which is positive with respect to the O.V. D.C. line, and on increasing portions of the cycle, and as long as the anode of $RE_7$ is positive with respect to the positive terminal of $C_6$, it charges $C_6$ with sufficient current to hold D.C. relay $RY_3$ closed for the duration of the ringing pulse.

Therefore, contacts S, SN are opened during the ringing pulses and no current is supplied to unit *d* for intermittently connecting the busy-signal to the line. However, this action is initiated between ringing pulses at which time $RY_3$ is open and contacts S, SN are closed.

*Unit d*

When $SW_2$ is turned to the "on" position actuating unit *c*, one set of contacts of $SW_2$ short circuits $R_{12}$. Between ringing pulses 48 v. D.C. is applied through $R_{13}$ to $C_8$ which charges until D.C. relay $RY_4$ closes, disconnecting contacts U, UN and removing the charging current. When sufficient charge on $C_8$ has been dissipated, $RY_4$ opens, and the cycle is ready to repeat itself. A snap action is desirable and one way of providing this for all $RY_4$ contacts is as follows.

The armature of $RY_4$ is held open by a small fixed magnet until more than normal actuating current is flowing. When the armature begins to move, it leaves the stronger area of magnetic field, allowing the high actuating current to snap the armature against the pole piece. When the armature opens, the magnet pulls it to a fully open position, causing the contacts to make a full-pressure low-resistance contact. This snap action of the electrical contacts prevents the armature from idling at a midway position where contacts U, UN are touching with a high resistance contact which reduces the coil current and stops the armature from moving further. When $RY_4$ is actuated, contacts U, UA shunt $C_8$ with a resistor, $R_{14}$, that acts to decrease the discharge time required to open $RY_4$ which would otherwise stay closed much longer than it was open. By adjusting $R_{13}$ and $C_8$, for the time the relay remains open, and $R_{14}$ for the time it remains closed, the intermittent action of $RY_4$ may be "shaped" to a uniform open-closed sequence at a rate of about 2 cycles per second. When $RY_4$ is closed, contacts T, TA connect the busy-signal (generated by unit *f*) to the telephone line through QA, Q and BA, B; when $RY_4$ is open, contacts T, TN connect the line to the input of unit *e* so that any incoming "remote-ring" signal may be utilized. This reciprocating action prevents any busy-signal output from entering unit *e* input and possibly adversely affecting this circuit's operation.

The above relay action also takes place when $SW_2$ is thrown to the "off" position, with the exception that this action continues during the time a ringing pulse is being received, the call-initiator hearing the ringing pulses with intermittent busy-signal superimposed. Also, when $SW_2$ is "off," $R_{12}$ is added to unit *d*, as is $C_7$. This is to virtually eliminate the effects of A.C. ringing signal upon the timing interval of $RY_4$ operation. $C_7$, of large capacity, charges through $R_{12}$ and maintains a relatively constant voltage as a source of power to $R_{13}$, $C_8$ and $RY_4$ even when individual cycles of ringing pulses swing the "SN end" of $R_{12}$ above and below average $C_7$ potential at its positive terminal. Since the average value of the ringing signal voltage is about 46 volts, this also tends to keep $C_7$ charged to this value during ringing pulses, less the drain caused by the relay circuit. Obviously, if it is decided that $SW_2$ could be left permanently in either position, this switch could be omitted along with the components which would not be utilized. Long term effectiveness of operation balanced against cost of components would help decide this question.

*Unit e. "Remote-Ring Signal" Sensing*

Contacts T, TN feed, to unit *e* input capacitor $C_9$, the D.C. line voltage, ringing signal, switching transients (at start and end of ringing pulses), random line noise, and, if being received, the 2.8 kc. remote-ring signal. $C_9$ is a D.C. isolation capacitor, as is $C_{11}$, and they present a medium impedance path to the 2.8 kc. signal, and a proportionately higher impedance to lower frequencies, particularly regular ringing frequencies. $L_2$, $C_{10}$ comprise a parallel resonant circuit tuned to 2.8 kc., having reasonable Q, and thereby peaking signals at this frequency. $TR_3$ and associated circuitry comprise a common-emitter transistor amplifier stage with a voltage gain of about 100 at 2.8 kc. Emitter by-pass capacitor $C_{14}$ is purposefully small, to permit current feedback in this stage by means of emitter resistor $R_{18}$, thereby considerably reducing gain at lower frequencies. Capacitor $C_{12}$ bypasses higher frequencies between base and emitter. Therefore, the frequency response at the output-capacitor $C_{13}$, shows a very sharp peak at 2.8 kc., with voltage response at 2 kc. and 4 kc. being "down" about 100 times as compared with a 2.8 kc. signal fed into $C_9$. The output from $C_{13}$ is fed to a common-collector transistor stage to provide low impedance output for charging capacitor $C_{16}$ with half-waves of 2.8 kc. signal which have been rectified by $RE_8$. Capacitor $C_{16}$ is coupled to the low impedance base-emitter input of power transistor $TR_5$ which was selected for its low collector-emitter resistance when conducting. Sufficient charge on $C_{16}$ causes $TR_5$ to conduct, thereby actuating relay $RY_5$. A 2.8 kc. signal of about .15 v. R.M.S. equivalent value introduced to $C_9$ will cause the relay to close. Much additional sensitivity could be obtained by increasing the values of $C_9$ and $C_{11}$—retuning $C_{10}$ as required—and by reducing $R_{21}$. However, this is not recommended as switching transients and random line noise may actuate $RY_5$. $R_{26}$ presents a slight bias to $TR_5$ input in order to maintain cut-off even with small charges on $C_{16}$ accumulated through rectification of the above mentioned extraneous random voltages. $C_{17}$ prevents $RY_5$ from closing as a result of any short duration transients charging $C_{16}$ to a level which might cause $TR_5$ to conduct instantaneously. $C_{18}$ acts as a "sink" to maintain relatively steady D.C. voltage at the arm of $R_{24}$ in spite of the A.C. ringing pulse excursions.

When the presence of a 2.8 kc. signal causes $RY_5$ to begin to close, contact ADA connects with AD in a "make-before-break" sequence which applies about 22 volts, reduced from line voltage by $R_{27}$, to the relay coil, assuring its complete closure. This closes contacts AB, ABA which re-establish the telephone signaling (bell) circuit, and opens contacts AC, ACN which remove power from units *c, d, e, f* and *g*, discontinuing their operation. Contacts AC, ACA help to discharge $C_{18}$ and so hasten the decay of the busy-signal generated by units *f, g* which would otherwise remain for several seconds.

The busy-signal has now stopped, and the caller hears only the ringing signal, indicating that the bell (or other signaling device) of the called telephone is now being signaled. At this time $RY_5$ is held closed by line voltage fed through $R_{27}$ and contacts R, RA of $RY_2$, and therefore the signaling (bell) circuit will remain re-established by AB, ABA as long as $RY_2$ is actuated, i.e., as long as the ringing signal continues, and for about 5 seconds after the last pulse, when the charge on $C_4$ has virtually been dissipated permitting $RY_2$ to open. Thus, when either the caller discontinues his call, or the called party "answers" his telephone, $RY_2$ opens, $RY_5$ follows, and the device returns to starting condition, ready to repeat the above sequence upon receipt of a subsequent ringing signal followed by the "remote-ring signal" if one should be sent by the call-initiator. Where no special signal is received, $RY_5$ does not close, the bell does not ring, the busy-signal continues until the caller discontinues his call; when the ringing signal ceases, $RY_2$ opens, and power is removed from contact RA and units *c, d, e, f* and *g* of the device.

*Units f, g. Busy Signal Generator and Remote Ring Signal Generator*

When $RY_2$ closes upon receiving the first pulse of an incoming ringing signal, line voltage is applied through R, RA; ACN, AC; and $R_{24}$, through which the current drawn by units *e, f* and *g* causes the voltage to drop to 24 v. D.C., and this voltage is applied to decoupling capacitor $C_{18}$ whose large capacity maintains a relatively stable D.C. voltage even when "A.C. plus D.C." ringing pulses are introduced to the input of $R_{24}$. This "stabilized" D.C. voltage is then applied through contacts WN, W to to the generator unit *f, g*—with the return circuit through YN, Y.

$TR_7$ oscillates in what could be called a Colpitts type circuit, $C_{22}$ and $C_{23}$ being proportioned to supply the feedback, and their series capacitance tuning $L_3$. The output is fed through $C_{21}$ to transistor amplifier stage $TR_6$, and the output of this stage through $C_{20}$ to the impedance-matching output transformer, $T_1$, which is coupled to the line through $C_{19}$. This coupling proceeds through TA, T; QA, Q; and BA, B when the intermittent busy-signal is being generated, the interrupting being performed by contacts TA, T. The signal level on the line is about 2 v. R.M.S. equivalent, at a frequency of about 900 C.P.S.

The "remote-ring" signal is normally generated only when the telephone is being used to place a call to another user whose telephone is similarly equipped and who has temporarily disconnected his signaling (bell) circuit which is indicated by a busy-signal generated at his telephone. Since the caller's telephone is now in use, the line voltage has dropped to approximately 5–10 volts. Therefore, the "remote-ring" push button 30 may also be used to connect the 45 v. battery to unit *f, g* to supply power, through $R_{11}$, WA, W and YA, Y. $R_{11}$ may be adjusted for desired 2.8 kc. output signal level. Note that XA, X by-passes the contacts TA, T and QA, Q on relays $RY_4$ and $RY_2$, inasmuch as these relays have not been actuated. Also, note that $L_2$, of relatively low inductance, has been paralleled with $L_3$ through VA, V. Thus, $L_2$, having lower impedance, determines the frequency of operation which is now higher, and this is tuned to 2.8 kc. by adjusting the series sum of $C_{22}$ and $C_{23}$, keeping their individual values proportioned for best feedback. $R_{31}$ and $R_{32}$ can be proportioned to make the oscillator frequency virtually independent of supply voltage over a considerable voltage range, although the collector-emitter voltage rating of $TR_7$ must not be exceeded. This will assure reliable "remote-ring" operation over the life of the battery.

Output capacitor $C_{19}$ serves several functions. It does not pass D.C., and therefore does not permit the output winding of $T_1$ to bridge the line and operate the ring-cut-off relay at the central office. So, neither does this winding cause reduction of the line voltage which is being used as a D.C. power source. The relatively low value of $C_{19}$ offers a reactance of several thousand ohms to ringing currents, and therefore has negligible effect in this respect. Yet, it offers sufficiently low impedance to the busy-signal and a lower impedance to the "remote-ring" signal generated in unit *f*, *g*—coupling both to the line satisfactorily.

The total D.C. load on the line, for operating all the relays and the transistor circuits which may be in use at any one time, is so low that the central-office ring-cut-off relay is not actuated, permitting later use of the continuing ringing signal for ringing the local signaling-bell.

While we have shown and described an embodiment of our invention, it will be understood that the diagrammatic and schematic illustrations and description of operation are intended to be illustrative only and the scope of the invention should be limited only by the scope of the hereinafter appended claims.

We claim:

1. In combination in a telephone system having a ring-cut-off relay at a central location, means for temporarily disabling a primary signaling circuit associated with a receiver such as a telephone at a first station without actuating the ring-cut-off relay, means for generating a distinctive busy-signal at the first station upon receipt of conventional ringing voltage, means for transmitting the distinctive busy-signal to a second station, and means for re-establishing the temporarily disabled primary signaling circuit after receipt of the distinctive busy-signal including generating means for producing an additional signal at the second station and means for transmitting the additional signal to the first station for counteracting the temporary disablement of the primary signaling circuit.

2. In a telephone system having a ring-cut-off relay at a central station, means for selectively disabling a primary signaling circuit in a telephone at a first station, means for generating and transmitting to a caller at a second station, upon receipt of ringing voltage at the first station, a distinctive busy-signal indicating the selectively disabled condition, holding means for preventing the ring-cut-off relay at the central station from operating, means for producing at the second station an additional signal for counteracting the selective disablement of the primary signaling circuit and means for re-establishing the selectively disabled primary signaling circuit upon receipt of the additional signal.

3. In a communication system, means for disabling a primary signaling circuit in a receiver at a first station, said disabling means including an electric timer device for controlling a switching element in an electric timer, said switching element being effective to disconnect the primary signaling circuit from main line voltage, means for generating and sending to a second station upon receipt of ringing voltage at the first station a distinctive busy-signal indicating the disabled condition, means for generating and sending an additional signal to the first station for counteracting the disablement of the primary signaling circuit, and means for re-establishing the previously disabled telephone signaling circuit responsive to the additional signal.

4. The system of claim 3 wherein the primary signaling circuit is a bell circuit.

5. The communication system of claim 4 wherein the electric timer device is a capacitor discharging through a resistance.

6. In a communication system having a ring-cut-off relay at a central station, means for temporarily disconnecting a primary signaling circuit of a telephone for a predetermined period of time, said predetermined period being controlled by an electric timer, said timer having a capacitor discharging through a resistance which controls the switching of the contact of the electric timer, means for generating and transmitting to a second calling station upon receipt of ringing voltage a distinctive busy-signal indicating the disabled condition of the primary signaling circuit at the first station, means for maintaining the ring-cut-off relay at the central station unactuated during generation of the distinctive busy signal, means for generating an additional signal at the second calling station operable to disconnect the disablement of the primary signaling circuit, and means for re-establishing the previously disabled telephone signaling circuit upon receipt of the additional signal.

7. In a communication system, means for disabling a primary signaling circuit in a telephone at a first station for a predetermined period of time, said means including an electric timer operating on very small quantities of power drawn from the main telephone line whereby normal telephone operation is unaffected, means for generating and transmitting to a caller at a second station, upon receipt of ringing voltage, a distinctive busy-signal indicating the disabled condition at the first station, means for generating an additional signal at the second station for counteracting the disabled condition of the primary signaling circuit, and means for re-establishing the previously disabled telephone signaling circuit upon receipt of the additional signal.

8. In a communication system a primary telephone signaling circuit interrupting means adapted to selectively disable the circuit for predetermined periods of time, an electric timer for maintaining the disabled condition of the primary signaling circuit, said timer being operated by very small quantities of power derived from the main telephone line whereby normal telephone operation is unaffected, means for generating and transmitting to a second station, upon receipt of ringing voltage at the first station, a distinctive busy-signal indicating the disabled condition at the first station, means for preventing actuation of a ring-cut-off relay at the central office, means for generating additional signal at the second station capable of counteracting the disablement of the primary signaling circuit, and means for re-establishing the selectively disabled primary signaling circuit in response to the additional signal.

9. In a telephone system having a ring-cut-off relay at a central station, a call receiving station, said call receiving station including a telephone receiver having a signaling circuit, and a call initiating station; means for disconnecting the signaling circuit at the call receiving station, means for generating a distinctive signal in response to an incoming ringing signal without actuating the ring-cut-off relay to thereby indicate the disconnected condition of the signaling circuit, means for transmitting the distinctive signal to the call initiating station, and means for effectively re-establishing the disconnected signaling circuit at the call receiving station, said re-establishing means including means for generating a signaling circuit restoring signal at the call initiating station and transmitting it to the call receiving station, and means at the call receiving station responsive to the restoring signal which effectively restores the signaling circuit.

References Cited in the file of this patent

UNITED STATES PATENTS

| | | |
|---|---|---|
| 2,481,840 | Hardgrave | Sept. 13, 1949 |
| 2,715,161 | Lutz | Aug. 9, 1955 |